March 8, 1966
A. A. AUSTIN
3,239,574
PROCESS FOR CYCLODODECATRIENE MANUFACTURE
Filed Dec. 21, 1962
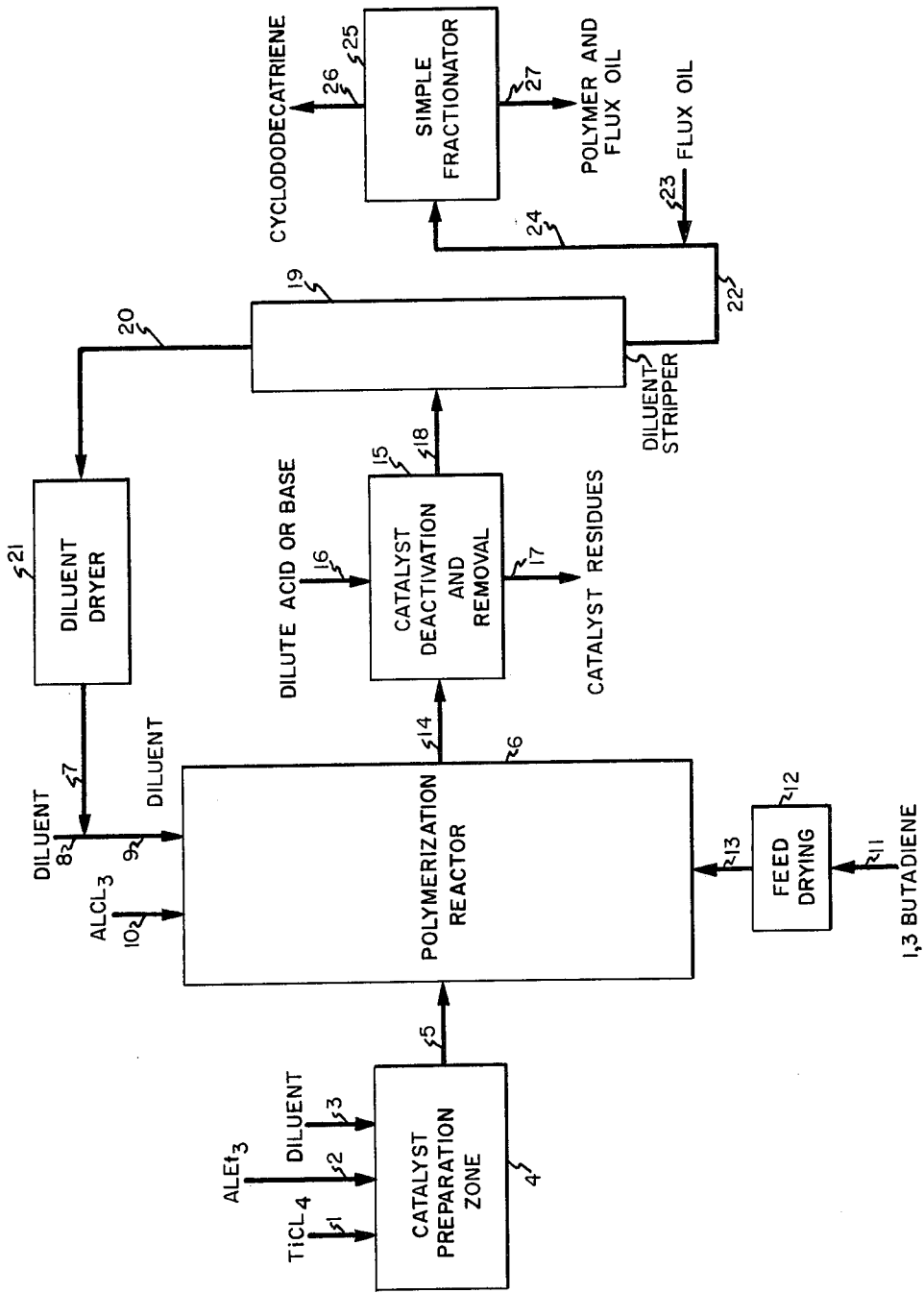
Adolph A. Austin  Inventor
By
Frank A. Simock
Patent Attorney United States Patent Office 3,239,574
Patented Mar. 8, 1966

3,239,574
PROCESS FOR CYCLODODECATRIENE
MANUFACTURE
Adolph A. Austin, Colonia, N.J., assignor to Esso Research and Engineering Company, a corporation of Delaware
Filed Dec. 21, 1962, Ser. No. 246,533
8 Claims. (Cl. 260—666)

The present invention relates to an improved process for the manufacture of cyclododecatrienes. More particularly, this invention relates to trimerizing butadiene in a diluent in the presence of an alkyl metal catalyst prepared from aluminum chloride, an aluminum alkyl and a titanium chloride. Yet more particularly, this invention relates to adding aluminum chloride to the diluent separated from the reaction products after deactivation and removal of the catalyst and using this stream with fresh aluminum alkyl-titanium chloride catalyst supplied to the reaction zone as the catalyst for polymerization. Most particularly, in a preferred embodiment, this invention relates to such a process to utilizing fresh catalyst prepared by reacting aluminum triethyl with titanium chloride, maintaining a total catalyst in the reaction zone having a mole ratio of aluminum to titanium of 2:1 to 1:1, and ethyl to aluminum mole ratio of 0.9:1 to 1.3:1 and maintaining water concentrations of less than 40 p.p.m. in the butadiene supplied, and less than 200 p.p.m. in the diluent recycled.

Prior to the present the production of cyclododecatriene by trimerizing butadiene in the presence of an alkyl metal catalyst consisting of $TiCl_4+AlEt_3$ or $TiCl_3+AlEt_2Cl$ has been generally disclosed in U.S. 2,964,574. In U.S. S.N. 19,184 filed April 1, 1960, now U.S. Patent No. 3,157,708, dated November 17, 1964, a preferred method for preparing the catalyst is described. According to this method catalysts are prepared from a mixture of titanium tetrachloride and aluminum alkyl and aluminum chloride. Thus, the $AlEt_3$ is reacted with titanium chloride in a $C_5$–$C_{12}$ aliphatic, aromatic or alicyclic hydrocarbon solvent at temperatures of −20 to 120° C., preferably 25 to 60° C. and contact times ranging from 1 minute to 360 minutes, preferably 5 to 30 minutes. The mole ratio of $AlCl_3$ to titanium tetrachloride is 1.0:1 to 1.5:1. Following the reaction sufficient $AlCl_3$ is added to bring the ethyl to aluminum ratio of the catalyst to 0.9:1 to 1.3:1, preferably 1.0:1 to 1.1:1. The entire catalyst mixture is then allowed to react an additional 1 to 240 minutes at 25 to 100° C., preferably 25 to 80° C., to obtain a removal of ethyl groups by an exchange reaction with $AlCl_3$. It should be noted that also rather than $AlCl_3$ it is contemplated that anhydrous $HgCl_2$, $BCl_3$, $AsCl_3$ and $SbCl_3$ may also be used under the same conditions and using similar amounts of these materials (as used with $AlCl_3$). It is preferred to utilize this method in the process of the present invention although the catalysts disclosed in U.S. 2,964,574 also may be used.

According to the present invention it has now been discovered that a further improvement in the process may be obtained by adding the $AlCl_3$ specifically to the diluent separated from the reaction products. This diluent contains light unsaturated impurities, including vinylcyclohexene and cyclooctadiene which tend to build up in the reaction zone and which interfere with the selectivity of the process. It has now been discovered that specifically by adding the $AlCl_3$ to the diluent these materials are polymerized to polybutadiene, that the said polybutadienes do not interfere in the reaction zone and that they are removed with the heavy product butadiene ordinarily obtained in the reaction in the conventional finishing steps.

Referring to the drawing describing a preferred method for manufacturing cyclododecatriene in a batch process according to the present invention, $TiCl_4$, $AlEt_3$ and diluent are supplied respectively through lines 1, 2 and 3 to catalyst preparation zone 4. After reduction of the $TiCl_4$ to $TiCl_3$ the mixture is supplied through line 5 to polymerization reactor 6. Prior to the supply of this catalyst mixture, recycle diluent is supplied through line 7 along the fresh makeup diluent supplied through line 8 and the combined stream is passed through line 9 to partially fill the reactor. Fresh $AlCl_3$ is then supplied through line 10 to the reactor and the diluent is contacted with $AlCl_3$ at temperatures of 20 to 150° C., preferably 20 to 60° C. for treating times of 1 minute to 1 hour, preferably 2 to 10 minutes, e.g. 5 minutes, The amount of $AlCl_3$ used may be 1 to 10 grams $AlCl_3$ per 1000 grams of diluent, e.g. 3 grams of $AlCl_3$ per 1000 grams of diluent. Catalyst mixture is then supplied to the reaction zone as previously described and is reacted with the $AlCl_3$ slurry at temperatures of 20 to 100° C., preferably 40 to 80° C., e.g. 60° C. for 5 to 360 minutes, preferably 10 to 60 minutes, e.g. 15 minutes. Butadiene is thereafter supplied through line 11 to a feed drying step 12, e.g. using conventional dryers such as activated alumina, molecular sieves, etc. The butadiene is dried to preferably less than 35 p.p.m. water, more preferably to less than 15 p.p.m. water and is continuously supplied through line 13 to the reactor. Polymerization is conducted to 0.1 to 3 pounds of cyclododecatriene per pound of diluent and the entire reaction products are then passed through line 14 to a catalyst deactivation and removal zone 15 where dilute, e.g. 5 wt. percent acid, e.g. hydrochloric, or base, e.g. sodium hydroxide, is added through line 16 to deactivate the catalyst and carry residues into the water phase. The water phase is settled and the catalyst residues and water are removed through line 17. Reaction products after removal of catalyst are then passed through line 18 to diluent stripper 19. The diluent is stripped overhead through line 20 and is passed to diluent dryer 21 wherein the level of water is reduced to less than 200 p.p.m. water preferably less than 100 p.p.m. water, e.g. less than 40 p.p.m. water before recycling through line 7 as previously described.

From the bottom of the diluent stripper 19 cyclododecatriene and heavier polybutadiene polymer is removed through line 22. Preferably a flux oil with a boiling point above 400° C. is added through line 23 and the combined stream is passed through line 24 to a simple fractionator 25, such as a wiped film evaporator wherein product cyclododecatriene is flashed off overhead through line 26. The bottoms materials consisting of oily polymer and flux oil is removed through line 27 and is discarded. It should be noted that in this diagrammatic representation of the batch process obvious storage and cooling facilities required are omitted for purposes of simplicity and that the obvious adaptation of this process to a continuous process is included in the present invention.

According to the present invention, compounds such as butadiene, isoprene, piperylene and dimethyl butadiene, preferably butadiene of industrial or instrument grade, e.g. above 95% butadiene, may be trimerized to obtain 1,5,9-cyclododecatrienes. Thus, methyl groups are present as side chains when isoprene, piperylene and dimethyl butadiene are used, e.g. the predominant product from isoprene is 1,5,9-trimethyl cyclododecatriene. Reaction conditions are temperatures in the range of 30 to 100° C., preferably 40 to 80° C., and pressures of 0.5 to 10, preferably 1 to 2 atmospheres. Contact times for the butadiene stream may be in the range of 30 to 600 minutes, preferably about 1 to 6 hours, while weight ratios of butadiene to diluent free catalyst supplied to the reactor may be in the range of 10 to 500:1, preferably 100 to 200:1. It is also contemplated that the present invention catalyst may be advantageously used in processes wherein dilute butadiene, isoprene and piperylene streams may be trimerized in accordance with the technique described in U.S. application Ser. No. 862,184, filed December 28, 1958, now abandoned. Thus, in these dilute diolefins feed stream processes both a selective trimerization of the diolefin to form the desired product and a purification of the remaining components (i.e. similarly to conventional extraction) are obtained.

Preferred diluents to be used in the present process are alkyl benzenes, benzenes, saturated hydrocarbons, chlorinated aromatics, e.g. chloro benzene, etc. These solvents should preferably boil in the range of 30° C. to 220° C., more preferably 130° C. to 200° C.

The present invention will be more clearly understood from a consideration of the following examples.

Example 1

In a dry reaction flask, 1.5 gr. $AlCl_3$ was added to 450 ml. xylene containing 1.4% cyclooctadiene and 1.5% vinylcyclohexene as impurities. A sample of the xylene withdrawn after five minutes at room temperature showed no traces of the impurities when analyzed by gas chromatography. To the mixture of $AlCl_3$ and xylene was added a Ziegler type catalyst prepared from $TiCl_4$ and $AlEt_3$. The final catalyst composition molar ratio was $AlEt_3/TiCl_4/AlCl_3=1.25/1.00/1.12$. The resultant mixture was brought up to the reaction temperature of 60° C. Very dry 1,3-butadiene was added to the slurry at the rate of about 3.7 gr./min. for 150 minutes until the reaction volume approximately doubled. The reaction was very vigorous, consuming all but 2 or 3% of the butadiene feed. Reaction temperature was maintained by intermitent external cooling with a Dry Ice-heptane mixture. The mixture was quenched with a ten-fold stoichiometric excess of 5 wt. percent dilute HCl and then fractionated to separate the products. Product recovery was 500 gr. of 1,5,9-cyclododecatriene (CDT), 61 gr. of polybutadiene, and 12 gr. of vinylcyclohexene and cyclooctadiene. Since these were the only products formed from the butadiene feed, the selectivity to CDT was 87.2%.

Example 2

Cyclododecatriene was prepared in a manner identical to that given in Example 1 except the xylene diluent contained no impurities. Selectivity to cyclododecatriene was 87% with the remainder being polybutadiene, vinylcyclohexene and cyclooctadiene.

Example 3

Vinylcyclohexene is a by-product of the CDT process. If allowed to build up to sufficiently high concentrations in the recycle solvent, it reduces the ability of the catalyst to form CDT. The following example is included only to illustrate this detrimental effect.

Cyclododecatriene was prepared in a manner identical to that of Example 2. After the reaction proceeded for 65 minutes consuming 100% of the butadiene feed, 15 ml. of 4-vinylcyclohexene-1 were added to the reaction flask. No change in the consumption of feed was noted to indicate that the catalyst activity was being affected. Another 15 ml. of vinylcyclohexene were added 15 minutes later. Within 10 minutes the catalyst activity decreased to the point where about 65% of the butadiene passed through the catalyst slurry unreacted. Ten minutes later the heat of reaction could no longer maintain reaction temperature indicating that the catalyst was essentially dead.

Example 4

Cyclododecatriene was prepared in a manner identical to that given in Example 1 except the entire catalyst was prepared external to the reaction zone and xylene diluent was recycled in the absence of any treating with $AlCl_3$. The following four runs illustrate the buildup successively of impurities in the recycled xylene diluent. In Run A fresh diluent was added to the reaction zone. In Run B diluent recovered from A was used. In Run C diluent from Run B, and in Run D diluent from Run C was used.

| Run | Wt. percent Cyclooctadiene | Wt. percent Vinylcyclohexene |
|---|---|---|
| A | 1.8 | 1.3 |
| B | 3.3 | 1.8 |
| C | 4.2 | 2.5 |
| D | 6.1 | 3.0 |

Example 5

Cyclododecatriene was prepared in additional runs comparing the prodedure of Example 1 with that of Example 4, Run A.

| Run | Method of Catalyst Preparation | Catalyst Selectivity to CDT (percent) | Catalyst Efficiency (g./g.) |
|---|---|---|---|
| A | $AlCl_3$ slurried in diluent | 88.9 | 100 |
| B | Total catalyst prepared outside reaction zone | 87.5 | 100 |

The data show that the performance of the catalyst was not detrimentally affected by using recycle xylene which had been precontacted with $AlCl_3$. This shows that not only is the recycled xylene purified of the light polymer but also the heavy polymer formed from it does not have a detrimental effect upon either product or the catalyst performance in the reaction zone.

Example 6

Runs were carried out as in Example 2 with various amounts of water as described contained in the butadiene supplied to the reaction zone.

| Run | Water in Butadiene (p.p.m. by volume) | Selectivity, percent | Catalyst Efficiency (g./g.) |
|---|---|---|---|
| A | 10 | 87.8 | 100 |
| B | 36 | 82.4 | 100 |
| C | 55 | 76.5 | 100 |
| D | 70 | 20.8 | 96 |
| E | 104 | 19.5 | 60 |

This data shows that water concentrations should preferably be held to less than 35 p.p.m.

Example 7

Runs were carried out as described in Example 2 with recycle xylene containing various amounts of water.

| Run | Water in Diluent Used for $AlCl_3$ Sol'n (p.p.m. by wt.) | Water in Diluent for Prep. of Reduced Catalyst (p.p.m. by wt.) | Selectivity (percent) | Catalyst Efficiency (g./g.) |
|---|---|---|---|---|
| A | 5 | 5 | 87.8 | 100 |
| B | 40 | 40 | 87.7 | 100 |
| C | 100 | 100 | 53.8 | 100 |
| D | 200 | 200 | 36.0 | 54 |
| E | 100 | 5 | 84.5 | 100 |
| F | 200 | 5 | 88.9 | 100 |

This data shows that water contents in the diluent may be as high as 200 p.p.m. without detrimentally affecting the performance of the catalysts as long as the reaction of $AlEt_3$ with $TiCl_4$ is carried out in a diluent containing less than 40 p.p.m. of water.

Example 8

Runs were carried out as described in Example 2 with various solvents.

| Solvent | Selectivity (percent) | Catalyst Efficiency (g./g.) | Final CDT Concentration in Solvent (Wt. percent) |
|---------|----------------------|----------------------------|--------------------------------------------------|
| Xylene  | 86.8                 | 100                        | 53.6                                             |
| Toluene | 86.0                 | 100                        | 54.9                                             |
| Xylene  | 86.5                 | 100                        | 52.5                                             |
| Xylene  | 87.5                 | 100                        | 73.5                                             |

This data indicates xylene and toluene are equally suitable in the process and that the solvent can be enriched to at least 70 to 75 wt. percent of cyclododecatriene with no loss in selectivity or efficiency.

It is to be understood that this invention is not limited to the specific examples, which have been offered merely as illustrations, and that modifications may be made without departing from the spirit of this invention. Thus, for example, throughout in this specification aluminum bromide may be read instead of aluminum chloride. Although more expensive, it is equally effective in place of aluminum chloride in the diolefin trimerization catalyst and also used alone to polymerize the light unsaturated impurities from the recycle diluent stream.

What is claimed is:

1. In a process for the trimerization of diolefins to cyclododecatrienes by reacting a diolefin selected from the group consisting of butadiene, isoprene, dimethylbutadiene and piperylene in a reaction zone in contact with a diluent and an alkyl metal catalyst prepared from aluminum chloride, an aluminum alkyl and a titanium chloride, hydrolyzing the reaction products to obtain an aqueous phase containing deactivated catalyst and an organic phase containing product cyclododecatrienes and diluent, separating the said phases, separating the diluent from the organic phase, recovering cyclododecatrienes from the organic phase remaining after removal of diluent and reducing the water level of the diluent to below 200 p.p.m. preparatory for reuse of the diluent in the process, the improvement which consists of contacting the separated, dried diluent with 1 to 10 weights of aluminum chloride per 1000 weights of diluent at temperatures of 20 to 150° C. for a period of time of less than one hour sufficient to obtain polymerization of light unsaturated impurities contained in the diluent, adding aluminum alkyl and titanium chloride to the aluminum chloride-containing diluent in an amount sufficient to restore essentially the original catalyst composition and adding further quantities of said diolefins to the resultant catalyst-diluent mixture to form further quantities of cyclododecatrienes.

2. In a process for the trimerization of butadiene to cyclododecatriene by reacting butadiene in a reaction zone by contact with a diluent and an alkyl metal catalyst prepared from aluminum chloride, an aluminum alkyl and a titanium chloride, hydrolyzing the reaction products to obtain an aqueous phase containing deactivated catalyst and an organic phase containing product cyclododecatriene and diluent, separating the said phases, separating the diluent from the organic phase, recovering cyclododecatriene from the organic phase remaining after removal of the diluent and reducing the water level of the diluent to below 200 p.p.m. preparatory for reuse of the diluent in the process, the improvement which consists of contacting the separated, dried diluent with 1 to 10 weights of aluminum chloride per 1000 weights of diluent at temperatures of 20–150° C. for a period of time of less than one hour sufficient to obtain polymerization of light unsaturated impurities contained in the diluent, adding aluminum alkyl and titanium chloride to the aluminum chloride-containing diluent in an amount sufficient to restore essentially the original catalyst composition and adding further quantities of butadiene to the resultant catalyst-diluent mixture to form further quantities of cyclododecatriene.

3. The process of claim 2 in which the alkyl metal catalyst has a mole ratio of aluminum to titanium in the range of 2:1 to 1:1 and an ethyl to aluminum mole ratio in the range of 0.9:1 to 1.3:1.

4. The process of claim 2 in which water concentrations in the butadiene supplied are less than 35 p.p.m. and in the aluminum chloride-treated diluent are less than 200 p.p.m.

5. The process of claim 2 in which the diluent is a material boiling in the range of 30° to 220° C. selected from the group consisting of benzene, alkyl benzenes, saturated hydrocarbons, and chlorinated benzenes and alkyl benzenes.

6. The process of claim 2 in which the alkyl metal catalyst is prepared by reducing $TiCl_4$ to $TiCl_3$ with $AlEt_3$ in a diluent containing less than 40 p.p.m. of $H_2O$, and the reduced mixture is then mixed with the aluminum chloride-treated diluent whereupon additional aluminum chloride is added to adjust the ethyl to aluminum mole ratio to 0.9:1 to 1.3:1.

7. The process of claim 2 in which the trimerization reaction is conducted at 30° to 100° C. to obtain a concentration of polymer in the reactor above 50 wt. percent based on diluent.

8. The process of claim 2 in which the alkyl metal catalyst is prepared by reducing $TiCl_4$ to $TiCl_3$ with $AlEt_3$ in a diluent containing less than 40 p.p.m. of $H_2O$, and the reduced mixture is then contacted with the recycled diluent containing aluminum chloride to adjust the ethyl to aluminum mole ratio to 0.9:1 to 1.3:1.

References Cited by the Examiner

UNITED STATES PATENTS

| 2,513,243 | 6/1950 | Leary et al. | 260—93.1 |
| 2,964,574 | 12/1960 | Wilke | 260—666 |
| 2,979,544 | 4/1961 | Wilke | 260—666 |

DELBERT E. GANTZ, *Primary Examiner.*

ALPHONSO D. SULLIVAN, PAUL M. COUGHLAN, *Examiners.*